W. H. STROM.
CLUTCH THROW-OUT BEARING MOUNTING.
APPLICATION FILED JULY 5, 1918.

1,402,458.

Patented Jan. 3, 1922.

Witnesses:
C. C. Gaylord,
A. Kovarik.

Inventor,
Walter H. Strom,
By Dyrenforth, Lee, Chritton & Wiles
Attys.

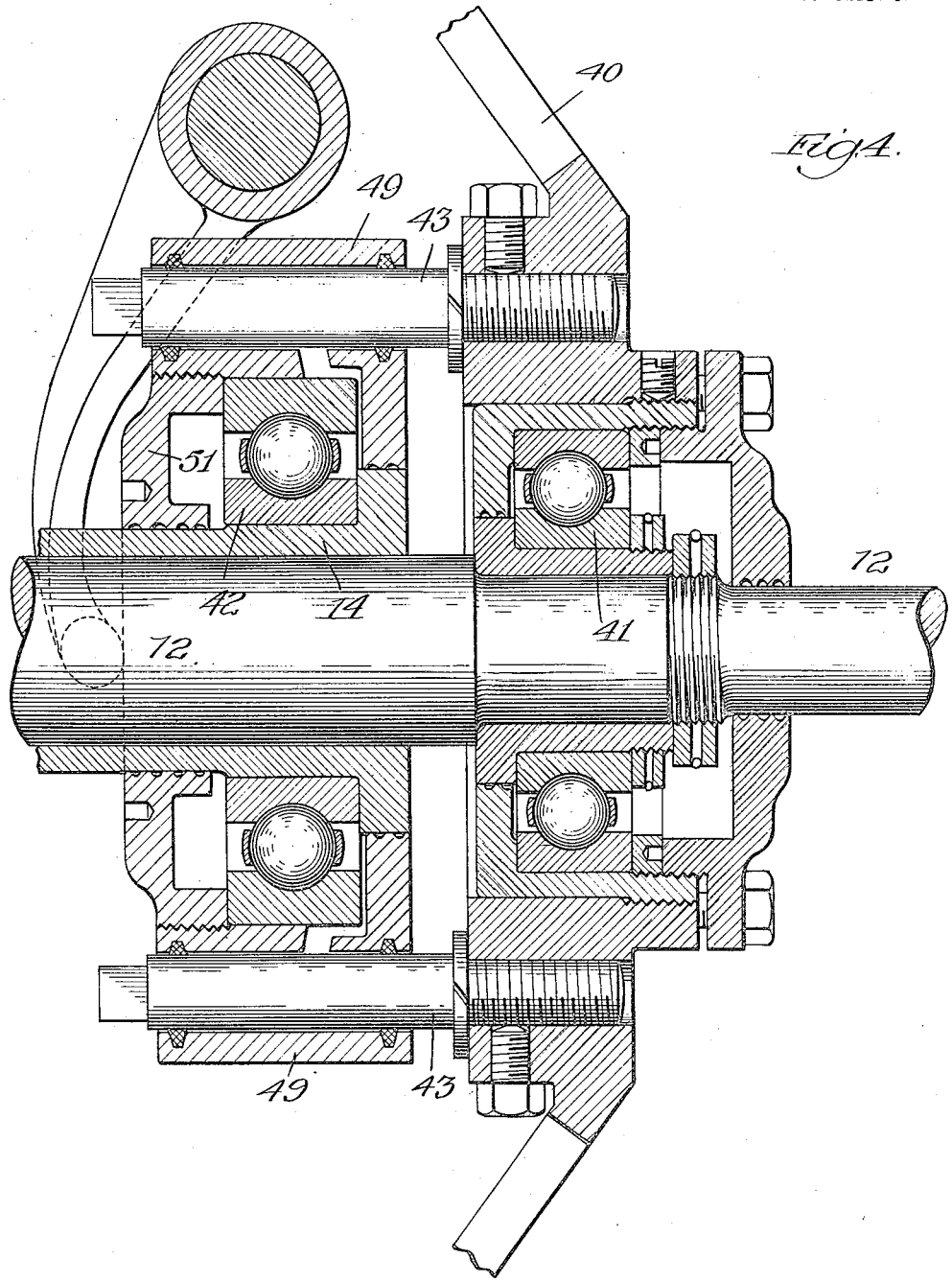

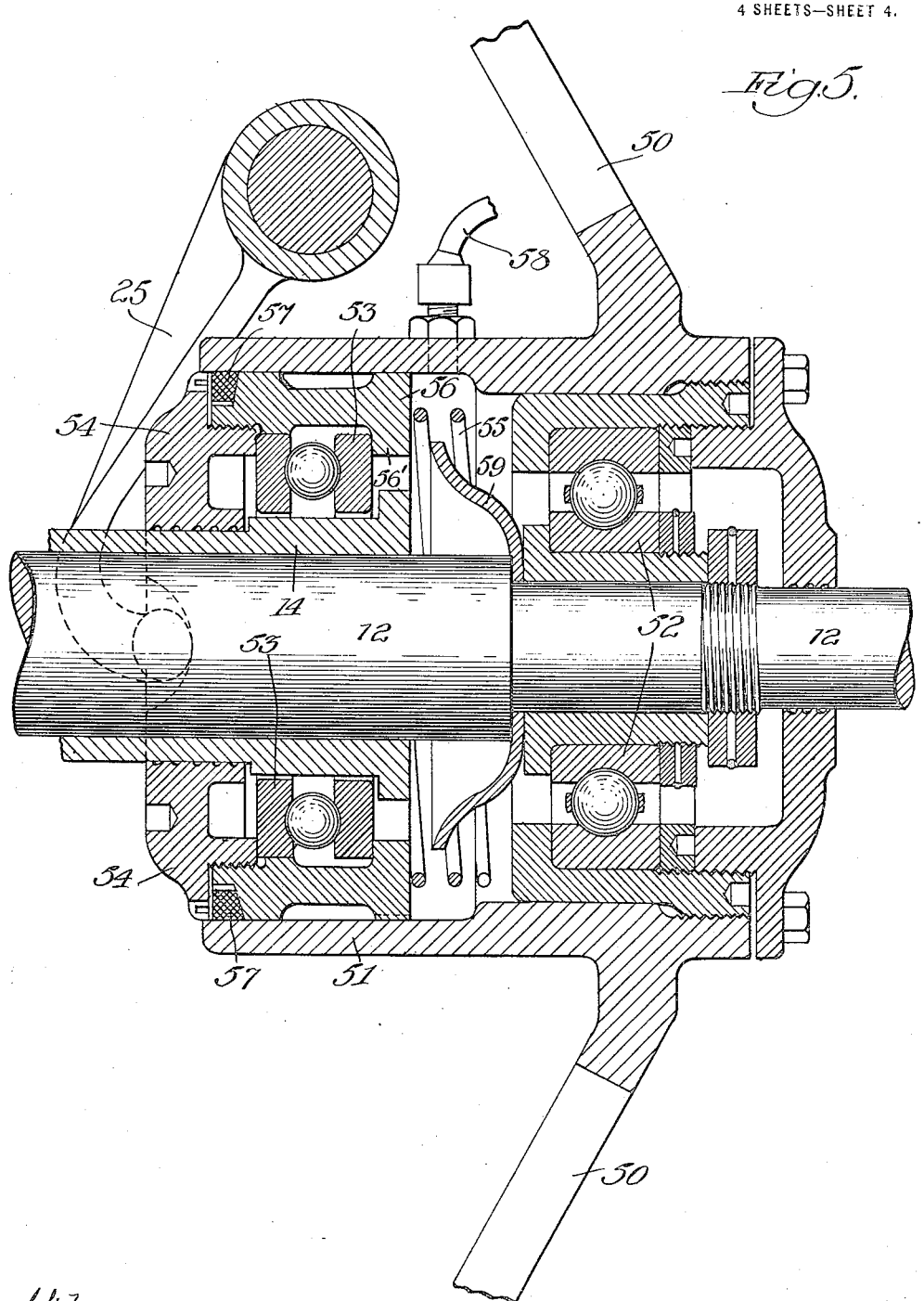

UNITED STATES PATENT OFFICE.

WALTER H. STROM, OF OAK PARK, ILLINOIS.

CLUTCH-THROW-OUT BEARING MOUNTING.

1,402,458.   Specification of Letters Patent.   Patented Jan. 3, 1922.

Application filed July 5, 1918. Serial No. 243,322.

*To all whom it may concern:*

Be it known that I, WALTER H. STROM, a citizen of the United States, residing at Oak Park, in the county of Cook and State of Illinois, have invented a new and useful Improvement in Clutch-Throw-Out Bearing Mountings, of which the following is a specification.

My invention relates to bearing mountings, and particularly to a bearing arrangement for use in connection with the clutch throw-out mechanism of motor vehicles. In general, the motors of such vehicles are connected to the transmission gearing by a friction clutch operable by the axial movement of one element thereof against the relatively heavy pressure of the spring which normally holds the friction surfaces in engagement.

It is common to provide between the revolving and axially movable clutch operating element and the levers which effect the movement of the same, some form of antifriction thrust-bearing of which the most common type is the ball thrust-bearing. My invention provides a construction including such a bearing mounted in an oil tight casing which may be kept constantly supplied with lubricant, thus avoiding to a large extent the difficulties which have heretofore been experienced with clutch throw-out bearings.

The invention will be fully understood from the following specification taken in connection with the accompanying drawings—in which—

Figure 4 is a similar section showing the manner of application of the bearing mounting to a combined radial and thrust bearing.

Figure 5 is a similar section showing a further modification of the mounting of the thrust bearing.

Figure 1:
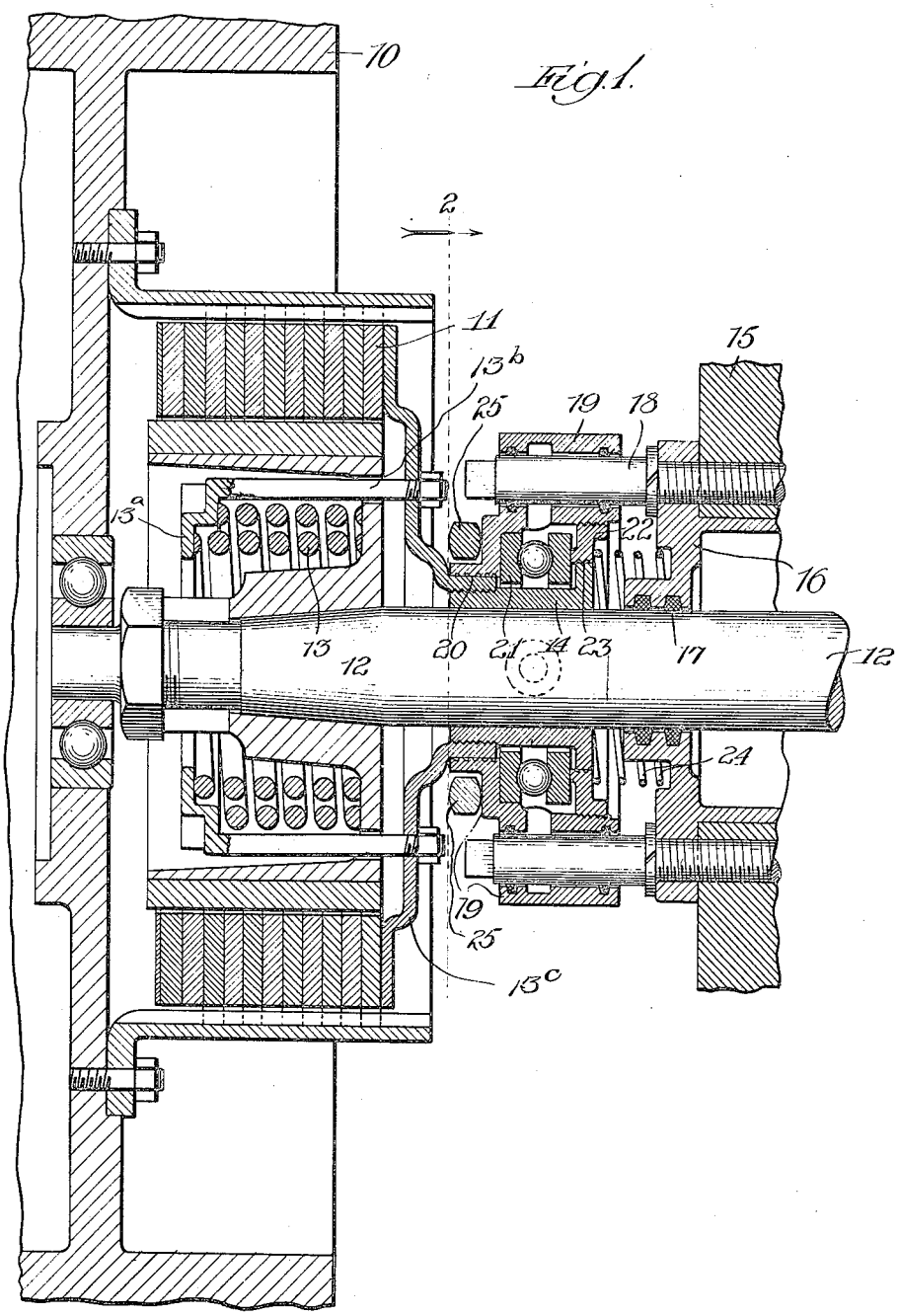
Figure 1 is a horizontal section through the clutch and clutch throw-out mechanism of a motor vehicle illustrating one embodiment of my invention.

Referring more particularly to the drawings, the numeral 10 designates the fly-wheel of an internal combustion engine, this fly-wheel being connected to the crank-shaft according to the standard practice, and serving to carry a multiple disc clutch 11 conventionally illustrated in the drawings.

It will be understood that in accordance with the usual practice one of the sets of discs of the clutch 11 will be connected through the clutch casing with the fly-wheel 10, while the other set of discs will be connected with the driven shaft member 12, the springs 13 normally serving to hold these two sets of discs in frictional engagement by a thrust exerted against the ring 13$^a$ held in fixed relation to plate 13$^c$ by threaded posts 13$^b$, the spring pressure being relieved by the axial movement of a flanged sleeve 14 threaded to plate 13$^c$ which slides upon the shaft 12. Beyond the sleeve 14 the shaft 12 is shown as entering a transmission housing 15 through an end plate 16 secured to the face of the latter which is provided with packing rings as shown at 17 to prevent loss of lubricant from the transmission casing.

In order to attach my improved bearing mounting to this construction I replace two or more of the bolts which ordinarily secure the end plate 16 to the transmission housing by shouldered studs 18 which project some considerable distance beyond the plate 16 and form slide journals for a hollow ring 19 which surrounds the axially shiftable clutch operating member 14 and forms an oil-tight joint therewith at one end, as shown at 20. Surrounding the clutch element 14 and within the interior of the ring 19 I mount a ball thrust-bearing consisting of two race members axially spaced by bearing balls. One of these race members, designated 21, may be pressed into a recess in the interior of the hollow ring 19 to tightly fit the same. The other race member is held in operative position by an annular nut 22 threaded into the open face of the hollow ring 19 and forming an oil-tight joint 23 with the peripheral surface of the flange on the clutch operating member 14. The annular nut 22 does not normally bear upon the radial outer face of the thrust bearing raceway, but has a running clearance therewith. A relatively light spring 24 interposed between the face of the end plate 16 and the outer surface of the annular nut 22 urges the latter and the hollow ring 19 into which it is screwed toward the left (as viewed in Figure 1) so that the ring 19 and the thrust-bearing therein is normally held away from the flange of the clutch operating element 14. The usual clutch throw-out levers or fingers 25 are provided, the ends of these members bearing upon the closed end of the hollow ring 19. A lubricant supply pipe 26, which may be flexible or may be jointed, is tapped into the top of the hollow ring to communicate with the cavity of the latter, this cavity including not only the thrust-bearing itself but being extended to communicate with the slide journals of the studs 18 as shown in Figure 1.

The operation of my improved clutch throw-out bearing mounting is as follows:

The position of the parts shown in Figure 1 is the normal or operative position, the clutch surfaces being in engagement. Under these conditions the spring 24 will have forced the hollow ring 19, together with the thrust-bearing housed within the same, to the left, as viewed in Figure 1 until the thrust-bearing clears the flange of the clutch operating element 14. The shaft 12 and the clutch operating element 14 therefore revolve as a unit within the hollow ring, without contacting with the latter save at the points 20 and 23, at which there is a running clearance. The thrust-bearing will remain still, both of its raceways being in contact only with the stationary housing ring.

When the throw-out fingers or levers 25 are actuated the ring 19 will be bodily shifted to the right, as viewed in Figure 1, until the right-hand raceway of the thrust-bearing engages the flange of the clutch operating element 14. Further movement will cause the clutch element to be shifted, the pressure of the clutch spring being borne by the thrust-bearing which now becomes operative, disengaging the surface of the annular nut 22 at the same time at which it engages the flange of the clutch operating member 14.

By the construction described it will be noted that the clutch throw-out thrust-bearing is housed within an axially shiftable hollow ring or casing which forms an oil-tight joint with the rotating member of the clutch. Means is furthermore provided by which the thrust-bearing is positively moved out of engagement with all rotating parts when not in operation, so that the high speed and destructive idle running of the bearing is prevented. The design of the parts described is such that their application to many standard types of motor vehicle clutch and transmission construction is possible.

Figure 3:
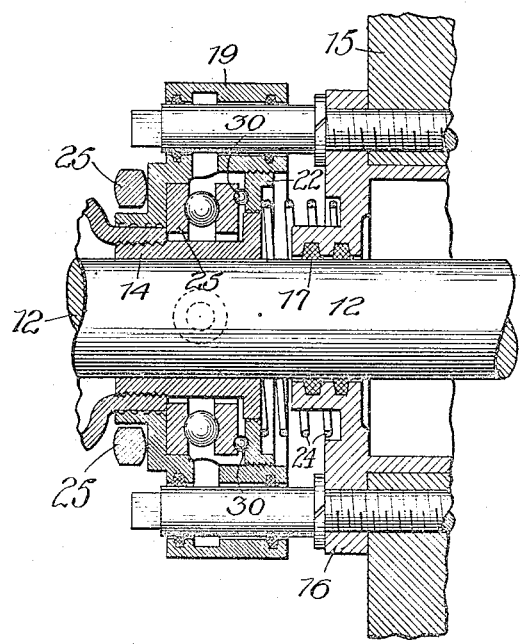
Figure 3 is a detailed horizontal section of a modified form of clutch throw-out bearing mounting.

In Figure 3 I have illustrated one modification of the bearing mounting described, the modification lying in the provision of an auxiliary row of bearing balls designated 30, which are interposed between the annular nut 22 and the opposed face of the race member. By the use of this auxiliary row of balls the race members of the thrust-bearing may always be held in their proper coaxial relationship, there being no longer any necessity for the clearance between the nut 22 and the adjacent raceway member. This auxiliary or supplemental thrust-bearing made up of the balls 30, the nut 22 and one of the races of the main thrust-bearing cannot under any circumstances carry any load, since upon the disengaging movement of the clutch, which is the only movement capable of loading the thrust-bearing, the thrust is in the opposite direction and tends to relieve the balls 30.

In Figure 4 I have illustrated a further modification of my improved construction, this modification being shown in connection with a motor construction embodying a bell housing designated at 40 which encloses the fly-wheel and clutch, as is well understood. The shaft 12, which is here supported by an annular ball bearing 41 carried by the bell housing, has sleeved upon it the flanged axially shiftable clutch operating element 14 as in the constructions previously described. In place of providing a similar thrust-bearing for the actuation of the clutch operating element 14. I have here illustrated a ball bearing 42 of the radial type, the inner race member being mounted upon the clutch sleeve 14 and against the flange thereof, while the outer race member is mounted within a hollow ring 49, similar to the ring 19 previously described and like the latter, mounted for longitudinal movement upon studs 43 which are here secured to the bell housing 40. The hollow ring 49 is open on its left-hand end, this end receiving an annular nut 51 which forms an oil-tight joint with the sleeve 14, while the flange of the sleeve forms a similar joint with the opposite face of the ring. The radial bearing illustrated in Figure 4 is intended to run at all times, carrying a part of the radial load of the shaft 12, as well as the intermittent thrust load applied by the actuation of the clutch.

Figure 2:
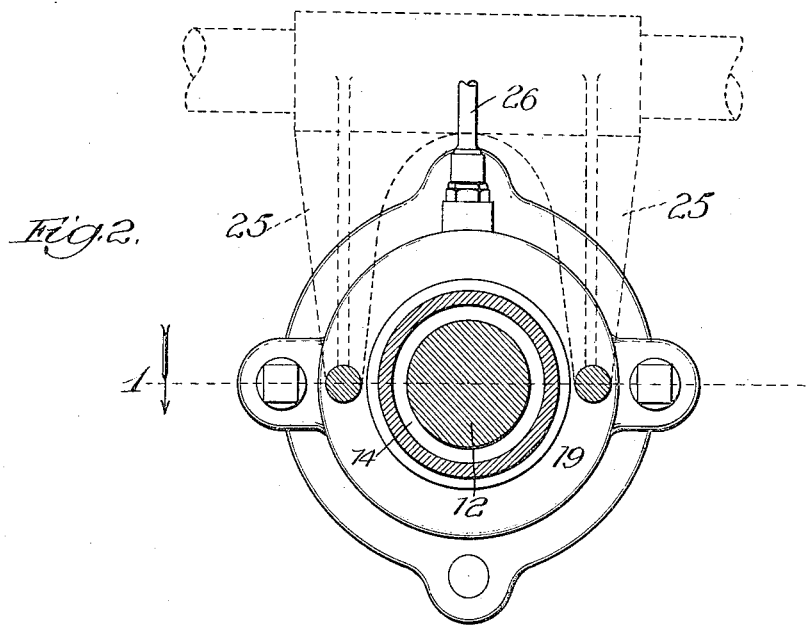
Figure 2 is a transverse section on the line 2 of Figure 1.

The construction shown in Figure 4, like that shown in Figures 1 to 3, is adapted for application to existing designs requiring only the addition of the supporting studs 43 to the existing structure. The cavity of the hollow ring 49 may be packed with lubricant or continuously supplied with lubricant through a pipe connection in the manner previously described.

In Figure 5 I have illustrated a further modification of my invention, illustrating a second method of applying my bearing mounting to a clutch bell housing. This housing, here designated 50, is specially formed to provide an inwardly projecting boss 51 which extends over the shaft 12, this same boss or hub portion receiving the shaft-supporting ball bearing 52, the mounting of which is well known and need not be particularly described. The clutch throw-out thrust-bearing lies between the shiftable clutch operating element 14 on the shaft 12 and a ring 56 which is axially movable within the bore of the boss 51, a felt packing ring 57 forming an oil-tight joint between the parts. The thrust-bearing here illustrated, which is of the standard type and designated 53, clears the sleeve 14, has one of its raceways mounted in the ring 56 and its other raceway abutting a flange $56^1$ carried by the ring, there being a running clearance between these parts, as determined by the seating of an annular nut 54 which closes the outer end of the ring 56 and forms an oil-tight joint at its inner periphery with the sleeve 14. The nut 54 has two notches formed at diagrammatically opposite points in its outer surface to receive the ends of the clutch throw-out fingers 25. A spring 55 is interposed between the mounting of the bearing 52 and the ring 56, serving to force the latter outward and hold it in engagement with the clutch throw-out fingers. This same spring causes the thrust-bearing 53 to normally clear the flange of the sleeve 14, as is shown in Figure 5, this flange being taken up by the initial actuation of the clutch throw-out fingers as was described in connection with the construction of Figure 1. Lubricant is supplied to the boss 51 and thence to the radial bearing 52 and clutch throw-out bearing 53 by pipe 58. A sheet-metal disc 59 may be secured to the shaft 12 to distribute the lubricant within the casing by centrifugal force.

In this construction it will be noted that the hollow ring which houses the clutch throw-out thrust-bearing is itself housed within the boss 51, the latter forming with the ring and the bearing mounting for the bearing 52 a closed chamber which may be kept supplied with lubricant. In place of splining or keying the ring 56 to prevent rotation of the latter the finger-receiving notches in the nut 54 are provided and serve the same purpose.

From the foregoing descriptions of various embodiments of my invention it will be clear that the invention is not limited to any specific construction but that it may embrace a wide variety of different constructions. I therefore do not wish to be understood as limiting my invention to any of the details of the mechanism illustrated and described, except in so far as such limitations are included within the terms of the accompanying claims in which it is my intention to claim all novelty inherent in the invention as broadly as is permissible in view of the prior art.

What I claim as new and desire to secure by Letters Patent is—

1. The combination with a rotatable and axially movable clutch throw-out sleeve of a non-rotatable and axially shiftable housing member surrounding the same and forming oil-tight joints therewith, a roller thrust-bearing lying within the said housing and having both of its race members supported by the housing to normally remain out of contact with the sleeve, and means for shifting the said housing to bring said thrust-bearing into engagement with the sleeve and upon further movement to shift the latter.

2. The combination with a rotatable and axially movable clutch throw-out sleeve, of a hollow ring surrounding the said sleeve and forming oil-tight joints therewith at its ends, means for supporting said ring for axial movement only, a roller thrust bearing housed within the cavity of the said ring and supported thereby and out of contact with the cylindrical surface of the sleeve, means for shifting said ring relative to the sleeve to bring the thrust-bearing out of contact with the radial surface of the said sleeve, and means for shifting the said ring in the opposite direction to engage the thrust-bearing and the radial surfaces of the sleeve and upon further movement effect the shifting of the sleeve.

3. In a motor vehicle construction, including a shaft, a clutch throw-out sleeve surrounding the shaft rotatable therewith and axially movable with respect thereto, a transmission case into which the shaft projects and an end plate for the said transmission case concentric with the said shaft, a plurality of studs securing said plate to the said transmission case and projecting in parallelism with the shaft, a hollow ring supported by the said studs for movement therealong, surrounding the said sleeve and forming oil-tight joints therewith, a thrust-bearing housed within the said ring and interposed between the same and the said sleeve, and means for axially shifting the said ring to effect axial movement of the said sleeve.

4. The combination with a rotatable and axially movable clutch throw-out sleeve of a non-rotatable and axially shiftable housing member surrounding the same, a roller thrust-bearing lying within the said housing and having both of its race members supported by the housing to normally remain out of contact with the sleeve, and means for shifting the said housing to bring said thrust-bearing into engagement with the sleeve and upon further movement to shift the latter.

5. In a motor vehicle construction, including a shaft, a clutch throw-out sleeve surrounding the shaft rotatable therewith and axially movable with respect thereto, a non-rotating plate surrounding the shaft, a plurality of studs secured to said plate and extending in parallelism with the shaft, a hollow ring supported by the studs for movement therealong, and surrounding said sleeve, a bearing housed within the ring and interposed between the same and the said sleeve, and means for axially shifting the said ring to axially move the sleeve.

WALTER H. STROM.